United States Patent
Grimberg (10) Patent No.: US 7,560,694 B2
(45) Date of Patent: Jul. 14, 2009

(54) METHOD AND SYSTEM FOR INCREASING SIGNAL-TO-NOISE RATIO IN MICROBOLOMETER ARRAYS

(75) Inventor: Ernest Grimberg, Kiryat Byalik (IL)

(73) Assignee: Opgal Optronics Industries, Ltd. (IL)

( * ) Notice: Subject to any disclaimer, the term of this patent is extended or adjusted under 35 U.S.C. 154(b) by 123 days.

(21) Appl. No.: 11/575,795

(22) PCT Filed: Sep. 12, 2005

(86) PCT No.: PCT/IL2005/000969

§ 371 (c)(1),
(2), (4) Date: Mar. 22, 2007

(87) PCT Pub. No.: WO2006/033095

PCT Pub. Date: Mar. 30, 2006

(65) Prior Publication Data

US 2008/0067388 A1   Mar. 20, 2008

(30) Foreign Application Priority Data

Sep. 23, 2004   (IL) .................................. 164246

(51) Int. Cl.
*H01L 25/00* (2006.01)
(52) U.S. Cl. ........................................ 250/332
(58) Field of Classification Search ............. 250/332
See application file for complete search history.

(56) References Cited

U.S. PATENT DOCUMENTS

| 5,698,852 | A | 12/1997 | Tanaka et al. |
| 6,697,108 | B1 | 2/2004 | Chen et al. |
| 7,123,687 | B2 * | 10/2006 | Colbeth et al. ............ 378/98.8 |

OTHER PUBLICATIONS

International Search Report, PCT/IL2005/000969, Feb. 23, 2006.

* cited by examiner

*Primary Examiner*—David P Porta
*Assistant Examiner*—Mindy Vu
(74) *Attorney, Agent, or Firm*—Cantor Colburn LLP (57) ABSTRACT

Device for retrieving electrical charge, resulting from electromagnetic radiation energy incident on a temperature sensor array, the temperature sensor array including a plurality of temperature sensor rows, each temperature sensor row including a plurality of temperature sensors, the device including a retrieval module array and a row select circuit, the retrieval module array including a plurality of retrieval module rows, each retrieval module row including a plurality of retrieval modules, each of the retrieval modules being operative to accumulate the electrical charge from a single temperature sensor, the row select circuit being coupled with the temperature sensor array, and with the retrieval module array, the row select circuit being operative for coupling the retrieval modules of each of the retrieval module row of the retrieval module array with a respective temperature sensor of a temperature sensor row of the temperature sensor array, for a time period which is greater than the frame acquisition period divided by the number of the temperature sensor rows.

15 Claims, 7 Drawing Sheets

METHOD AND SYSTEM FOR INCREASING SIGNAL-TO-NOISE RATIO IN MICROBOLOMETER ARRAYS

CROSS REFERENCE TO RELATED APPLICATION

This application is a National Stage filing of International Application PCT/IL2005/000969 which claims priority to Israel patent application 164246 filed on Sep. 23, 2004, the contents each of which are incorporated herein by reference thereto.

FIELD OF THE DISCLOSED TECHNIQUE

The disclosed technique relates to thermal cameras, in general, and to methods and microbolometers, in particular.

BACKGROUND OF THE DISCLOSED TECHNIQUE

A bolometer is a temperature sensor that can be used as an infrared radiation sensing device, well known in the art. The bolometer senses the incident infrared radiation by changing its temperature. The change in temperature causes a change in the electrical resistance of the bolometer. The resistance of the bolometer either increases or decreases, depending on the material the bolometer is made off. According to a simple model of a bolometer, wherein only incident infrared radiation is considered, the infrared radiation energy can be determined by measuring the change of the bolometer resistance. It is noted that the temperate of a bolometer may further change (i.e., other that radiation) by exchanging heat energy with the surroundings (e.g., air or electrical contacts) of the bolometer, via conduction. The temperature of a bolometer may further change due to current, flowing through a bolometer, during the measurement process. The change in temperature, due to current flow, is known as self-heating. In calculating the power dissipation in a bolometer, the noted phenomena should be accounted for.

A microbolometer is small bolometer usually in the order of a few tens of microns in size. Microbolometers are commonly used in infrared imaging devices. An introduction to bolometers is provided by "Low-Cost Uncooled Infrared Detectors in CMOS Process" by Eminoglu et. al, available at www.sciencedirect.com.

Figure 1A:
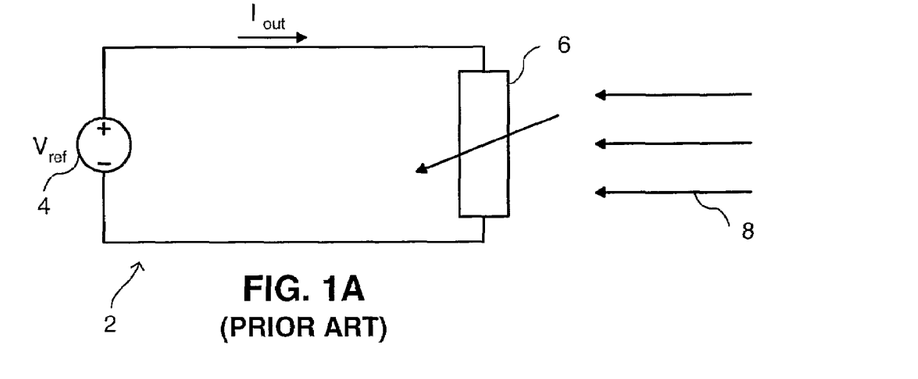
FIGS. 1A, 1B, 1C and 1D are schematic illustrations of a thermal imaging microbolometer apparatus, which are known in the art.

Reference is now made to FIG. 1A, which is a schematic illustration of an exemplary thermal imaging microbolometer apparatus, generally referenced 2, which is known in the art. Apparatus 2 measures the resistance of a bolometer using a reference voltage, according to a simple model. This simple model operates under the assumption that the measurement activity, negligibly changes the bolometer temperature, due to the energy dissipated during the measurement process.

Apparatus 2 includes a reference voltage source 4 and a bolometer 6. Bolometer 6 is coupled in parallel with reference voltage source 4. Voltage source 4, supplies a constant voltage across bolometer 6. Infrared radiation 8, incident on bolometer 6, causes the resistance of bolometer 6 to change. Consequently, when the reference voltage is applied to the bolometer, the current through bolometer 6, $I_{out}$, changes. The resistance of bolometer 6, is determined by measuring $I_{out}$ with a current measuring device, known in the art (not shown) and applying the law of Ohm. The law of Ohm, known in the art, is stated in Equation (1)

$$R_b = \frac{V}{I} \qquad (1)$$

wherein, $R_b$ is the resistance of the bolometer, V is the voltage across the bolometer and I is the current through the bolometer. In apparatus 2, the voltage across bolometer 6 is $V_{ref}$ and the current through bolometer 6 is $I_{out}$.

Figure 1B:
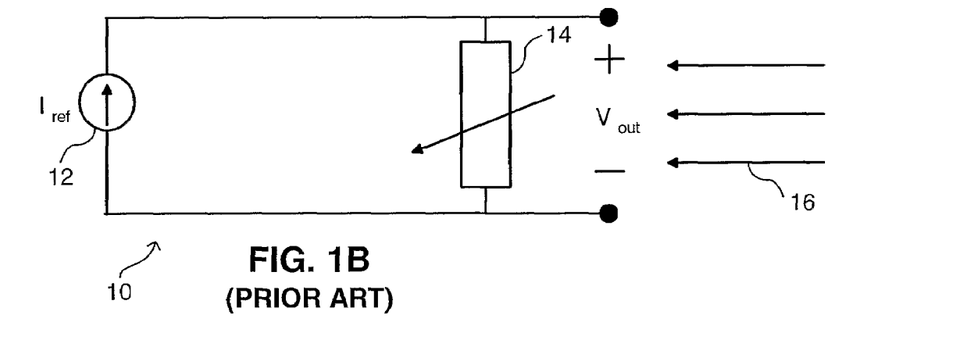

Reference is now made to FIG. 1B, which is a schematic illustration of an exemplary thermal imaging microbolometer apparatus, generally referenced 10, which is known in the art. Apparatus 10, measures the resistance of a barometer, using a reference current, according to the model of FIG. 1A.

Apparatus 10 includes a reference current source 12 and a bolometer 14. Bolometer 14 is coupled in parallel with current source 12. Current source 12 provides a constant current, $I_{ref}$, through bolometer 14. Infrared radiation 16, incident on bolometer 14, causes the resistance of bolometer 14 to change. Consequently, when the reference current is applied to the bolometer, the voltage, across bolometer 14, $V_{out}$, changes. The resistance of bolometer 14, is determined by measuring $V_{out}$ with a voltage measuring device, known in the art (not shown) and applying the law of Ohm, stated in equation (1). In apparatus 10, V is the voltage across bolometer 14, $V_{out}$ and I is the reference current $I_{ref}$.

Figure 1C:
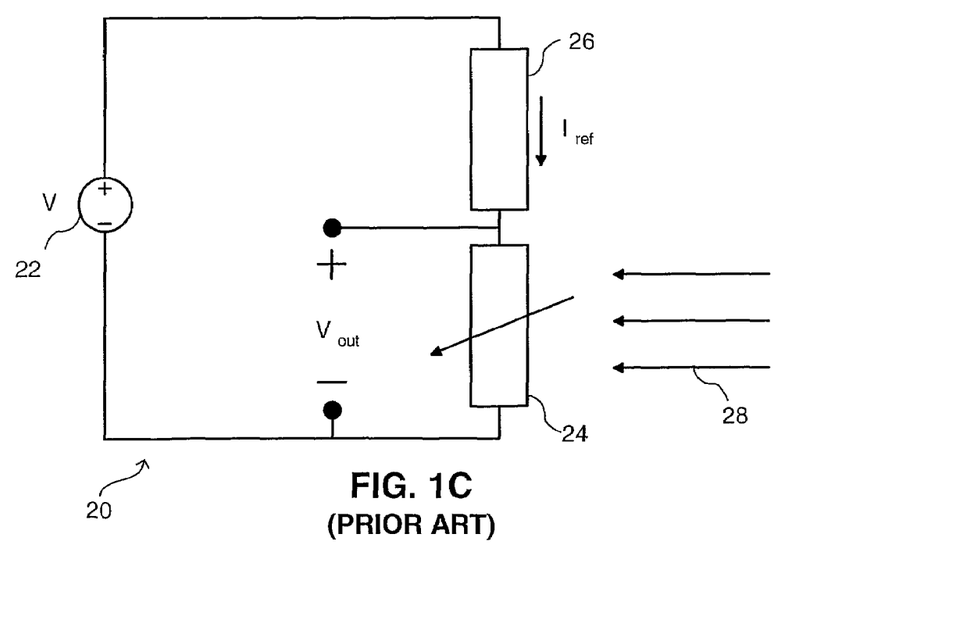

Reference is now made to FIG. 1C, which is a schematic illustration of an exemplary thermal imaging microbolometer apparatus, generally referenced 20, which is known in the art. Apparatus 20, measures the resistance of a bolometer, using a reference current created by a voltage source and a reference resistor, according to the model of FIG. 1A. Apparatus 20 includes a voltage source 22, a bolometer 24 and a reference resistor 26. Reference resistor 26, is coupled in series with bolometer 24. Voltage source 22 is coupled with the series combination of reference resistor 26 and bolometer 24. Voltage source 22 supplies a constant voltage across the series combination of reference resistor 26 and bolometer 24.

Infrared radiation 28, incident on bolometer 24, changes the resistance of bolometer 24. Consequently, when the reference current is applied to the bolometer, the voltage across bolometer 24, $V_{out}$, changes. The resistance of bolometer 24, is determined by measuring $V_{out}$. $V_{out}$ is measured with a voltage measuring device, known in the art (not shown) and applying equation (2)

$$R_b = \frac{V_{out} R}{V - V_{out}} \qquad (2)$$

wherein V is the voltage across the series combination of the bolometer and the reference resistor, $V_{out}$ is the voltage across the bolometer and R is the resistance of the reference resistor. In apparatus 20, V is voltage source 22, R is the resistance of reference resistor 26 and $V_{out}$ is the voltage measured across bolometer 24.

Measuring signals (e.g., current, voltage) in an electrical system is a process accompanied by electrical disturbances known as noise. Noise may cause errors in the measurement. It is therefore desirable to increase the signal and reduce the noise (i.e., increase the signal to noise ration). In order to increase the signal to noise ration (i.e., SNR) of the bolometer signal measurement, a more common technique involves measuring the accumulated current through or voltage across the bolometer over time (i.e., integrating the current through the bolometer over a predetermined time period). The integration operation in effect "averages" the measured signal (i.e., the desired signal and the noise), over the predetermined time period.

Figure 1D:
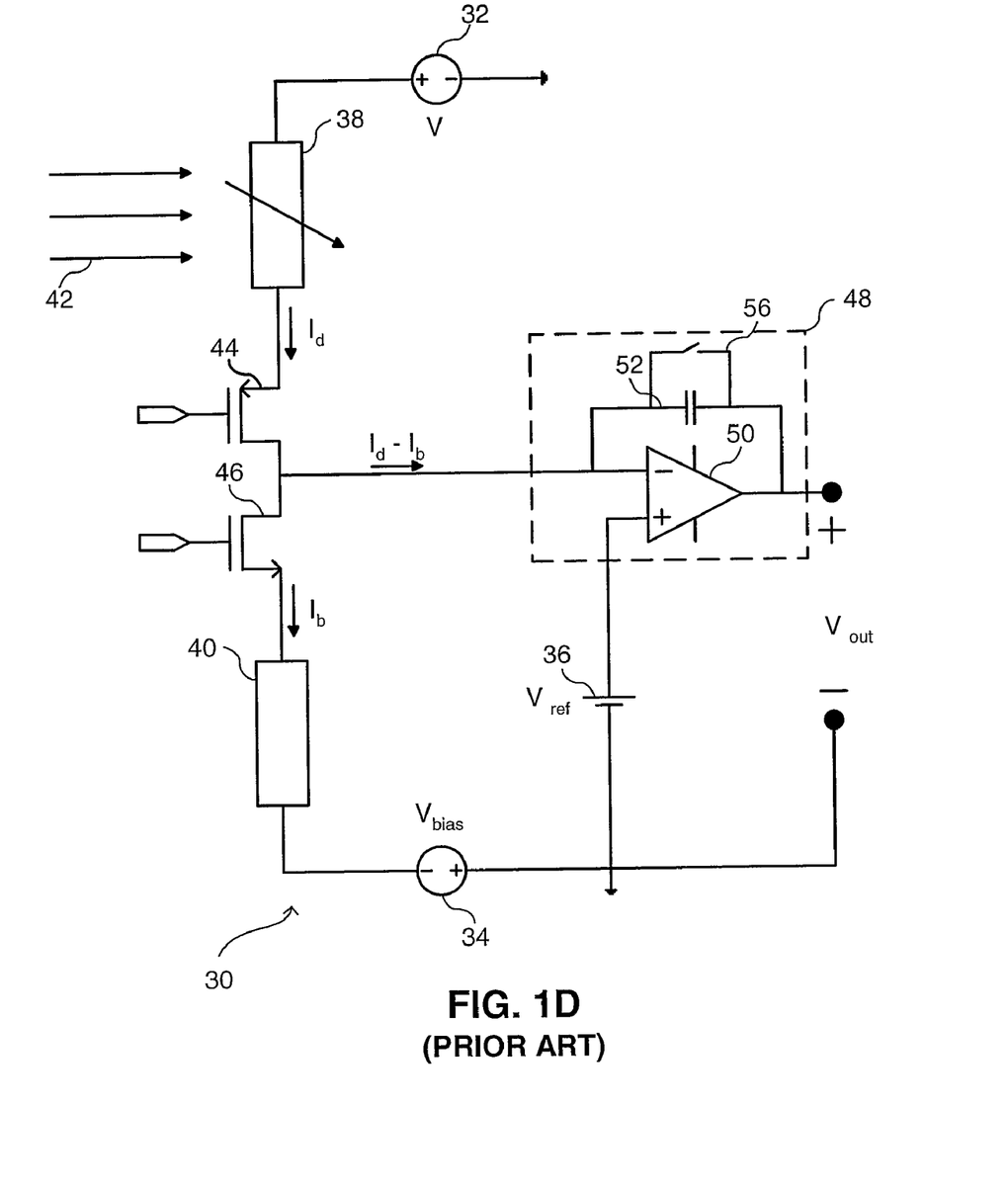

Reference is now made to FIG. 1D, which is a schematic illustration of a thermal imaging microbolometer apparatus, generally referenced 30, which is known in the art. Apparatus 30, integrates the current through the bolometer over a predetermined time period. The current through the bolometer is related to the resistance of the bolometer by equation (1). The resistance of the bolometer may change due to incident radiation. Apparatus 30 may be a part of an integrated circuit including several microbolometers. Apparatus 30 includes three voltage sources 32, 34 and 36, a bolometer 38, a reference resistor 40, a pMOS transistor 44, an nMOS transistor 46 and an integrator 48. Integrator 48, known in the art, further includes an amplifier 50, a feedback capacitor 52 and a switch 56.

The negative terminal of voltage source 32 is coupled with ground. The positive terminal of voltage source 32 is coupled with one of the terminals of bolometer 38. The other terminal of bolometer 38 is coupled with the source terminal of pMOS transistor 44. The drain terminal of pMOS transistor 44 is coupled with the drain terminal of nMOS transistor 46. The source terminal of nMOS transistor 46 is coupled with one of the terminal of reference resistor 40. The other terminal of reference resistor 40 is coupled with the negative terminal of voltage source 34. The positive terminal of voltage source 34 is coupled with ground. The negative terminal of voltage source 36 is coupled with ground and the positive terminal of voltage source 36 is coupled with the positive input terminal of amplifier 50. The negative input terminal of amplifier 50 is coupled with the drain terminals of pMOS transistor 44 and nMOS transistor 46. One of the terminals of feedback capacitor 52 and switch 56 are coupled with the negative input terminal of amplifier 50. The other terminals of feedback capacitor 52 and switch 56 are coupled with the output terminal of amplifier 50.

Voltage source 32 provides a reference voltage and thus a reference current to the circuit. Voltage source 34 provides the bias value of the voltage across the negative input terminal of amplifier 50 and ground. Voltage source 36 sets the bias value of the voltage across the positive input terminal of amplifier 50 and ground. pMOS transistor 44 provides a mean to control the reference current through bolometer 38 and nMOS transistor 46 in conjunction with resistor 40 provides a mean to reduce the value of the current through the bolometer and to compensate for temperature fluctuations in the immediate surrounding of the microbolometer (e.g., temperature fluctuations of the substrate in an integrated circuit). Resistor 40 is a thermally shorted microbolometer typically used in microbolometer readout circuits. Switch 56 controls the integration period.

Incident radiation 42, changes the resistance of bolometer 38. Thus, the current through bolometer 38 changes during the integration operation. Amplifier 50 may be an operational amplifier, known in the art wherein, the voltage difference across its negative and positive input terminals is approximately zero causing the charge flow into the negative terminal of amplifier 50 to accumulate on capacitor 56. Thus, Integrator 48, integrates the current through the negative terminal of amplifier 50 over a predetermined period, controlled by switch 56. Consequently, the output of integrator 48 relates to the accumulated incident energy on bolometer 38.

Microbolometers for infrared imaging are typically fabricated on integrated circuits in a two dimensional N×M array of microbolometers, each functioning as a single picture element known as a pixel. The array senses the change in temperature of a focal plane of incident radiation. The change in the resistance, of each microbolometer in the array, is translated to an electrical signal as described above. The electrical signal can, be transferred, for example, to an imaging device for display or to a memory device for storage.

A Read Out Integration Circuit (ROIC) is an electrical circuit for integrating the electrical signal resulting from the incident radiation in a microbolometer pixels. The term "Retrieval" relates to the operation of integrating the electrical signal relating to incident radiation on the microbolometer pixel and releasing. The term "Releasing" relates to transferring the resulting integrated electrical signal out of an ROIC module. The term "Resetting" is the operation of clearing the ROIC from previous values (i.e., the integrated electrical signals), to ensure the integrity of the values resulting from the next integration operation. An ROIC is a device performing retrieval.

An array of microbolometer pixels in combination with an ROIC module or modules is known as a microbolometer Focal Plane Array (FPA). The time period of retrieving an entire two dimensional array of microbolometer pixels, is known as a frame acquisition retrieval period, and is denoted Q. During the frame acquisition period, the microbolometer pixel is exposed to incident radiation for an ample portion of Q, known as exposure period. During exposure period, the resistance of the microbolometer changes to a value related to the temperature of the focal plane of the incident radiation. For the remaining portion of the frame acquisition period, the microbolometer pixel is retrieved. During the microbolometer pixel retrieval period, reference current is applied through the microbolometer. The reference current is applied through the microbolometer in order to acquire a measurement relating to the resistance of the microbolometer, and consequently to the incident radiation on the microbolometer. The measurement is integrated over a predetermined time period to increase the SNR.

A pixel in an FPA may be retrieved by selecting a row of pixels, enabling retrieval of all the pixels in the selected row. A specific pixel, to be retrieved, is selected from the enabled row. Thus, the pixel is coupled with the ROIC module. The ROIC module retrieves the selected pixel. This process is repeated until all the pixels are retrieved. Accordingly, the pixel retrieval time period is the frame acquisition period Q, divide by the number of pixels M×N (i.e., Q/M×N). Releasing and resetting the ROIC module takes a few microseconds. Thus, the actual integration period slightly less than Q/M×N. The microbolometer exposure period to incident radiation is thus slightly less than Q.

Johnson noise is the noise generated by thermal agitation of electrons in a conductor. Johnson noise is a dominant source of noise in microbolometers that might degrade the performance of FPA systems. Johnson noise is usually more dominant than other noise sources such as KTC noise and thermal fluctuation noise. The Johnson noise is proportional to the square root of the bandwidth of the system. The bandwidth of the system is controlled by the integration period of the ROIC. An expression for the Johnson noise in degrees Kelvin is given in Equation (3)

$$\Delta T_{johnson\_noise} = \frac{1}{I_d \alpha} \sqrt{\frac{4kT_d}{R_b T_i}} \qquad (3$$

wherein $I_d$ is the current through the microbolometer, $T_d$ is the temperature in degrees Kelvin of the microbolometer, $R_b$ is the resistance of the microbolometer, $T_i$ is the readout integration period during which a measurement relating to the resistance of the microbolometer is acquired, a is the temperature coefficient of resistance of the bolometer and k is Boltzmann's constant. Reducing the bandwidth or alternately increasing the integration period reduces the Johnson noise and consequently improves the performance of the FPA system.

U.S. Pat. No. 5,698,852 issued to Tanaka et al entitled "Titanium Bolometer-Type Infrared Detecting Apparatus" is directed to a method wherein two ROICs are used in order to increase the integration period. The integration period is increased to slightly less than 2Q/M×N. A pixel in the array is retrieved by selecting a row of pixels, enabling the retrieval of all the pixels in the row. A specific pixel, to be retrieved, is selected from the enabled row. Initially, the first ROIC module is allocated to a selected pixel. The selected pixel is coupled with the first ROIC module. After a delay of Q/M×N, the second ROIC module is allocated to another selected pixel. The other selected pixel is coupled with the second ROIC module. After a delay of slightly less than Q/M×N the first ROIC module is released and reset. The next pixel in the row is selected and coupled with the first ROIC module. After a delay slightly less than Q/M×N the second ROIC module is released and reset. The next pixel in the row is selected and coupled with the first ROIC module. This process is repeated until all the rows of the pixel array are retrieved. Consequently, integration time period is increased to slightly less than 2Q/M×N for each pixel.

U.S. Pat. No. 5,965,892 issued to Tanaka entitled "Thermal-Type Infrared Imaging Device", is directed to a method of operation, similar to that described in U.S. Pat. No. 5,698,852. In addition, Tanaka describes a row select circuit selects only odd rows during the first half of the integration period. Even rows are retrieved during the second half the integration period.

U.S. Pat. No. 6,028,309 issued to Parrish et al entitled "Method and Circuitry for Correcting Temperature-induced Errors in Microbolometer Focal Plane Array" is directed to a method of simultaneously integrating all the pixels in a row, from an array of microbolometer pixels.

Figure 2:
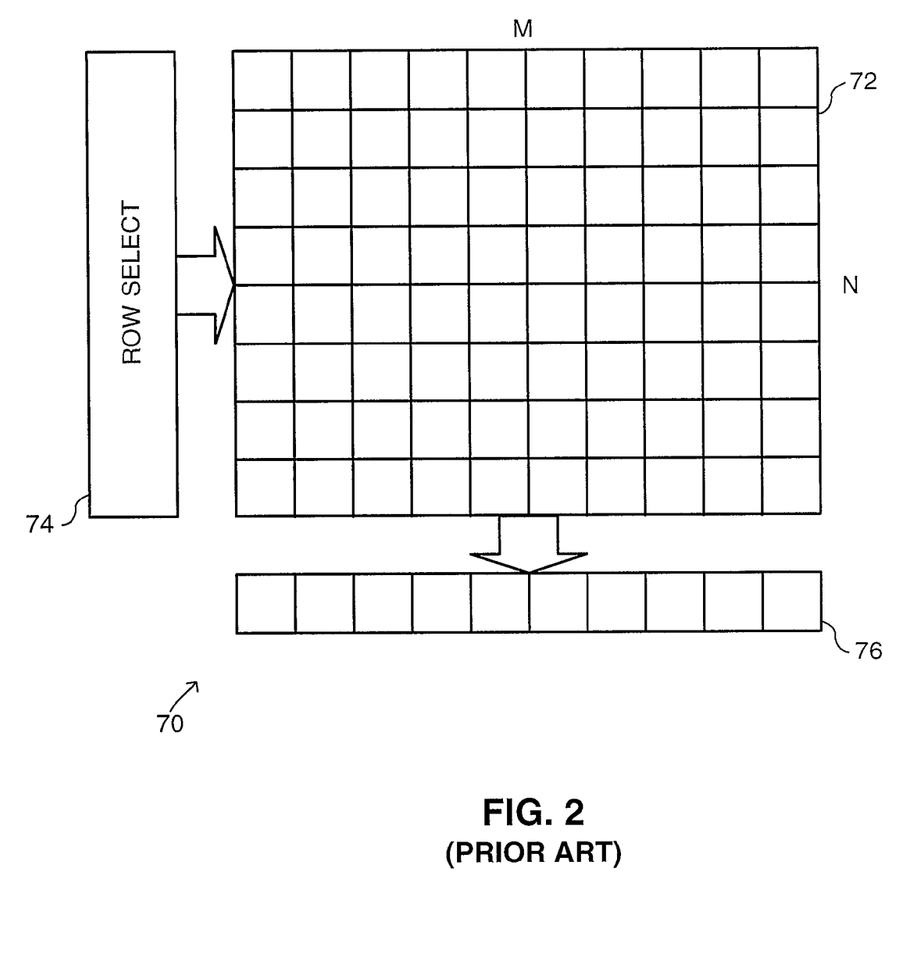
FIG. 2 is a schematic illustration of an FPA system, which is known in the art.

Reference is now made to FIG. 2, which is a schematic illustration of an FPA system, generally referenced 70, which is known in the art. System 70 integrates a row of pixels, from an array of pixels, with a row of M ROIC modules. System 70 includes an N×M array 72 of microbolometer pixels, a row select circuit 74 and a row of M ROIC modules 76 also referred to as ROIC row. Row select circuit 74, is operative to select all the pixels of a specific row, to be retrieved. Thus, each pixel element in the selected row is coupled with a respective ROIC module in ROIC row 76. ROIC row 76 integrates the entire selected row for a period of slightly less than Q/N. After integration is completed, the signals are released. The ROIC modules are reset. Row select circuit 74 selects the next row of microbolometer pixels to be retrieved. This operation is repeated, until all the rows of array 72 are retrieved.

Figure 3:
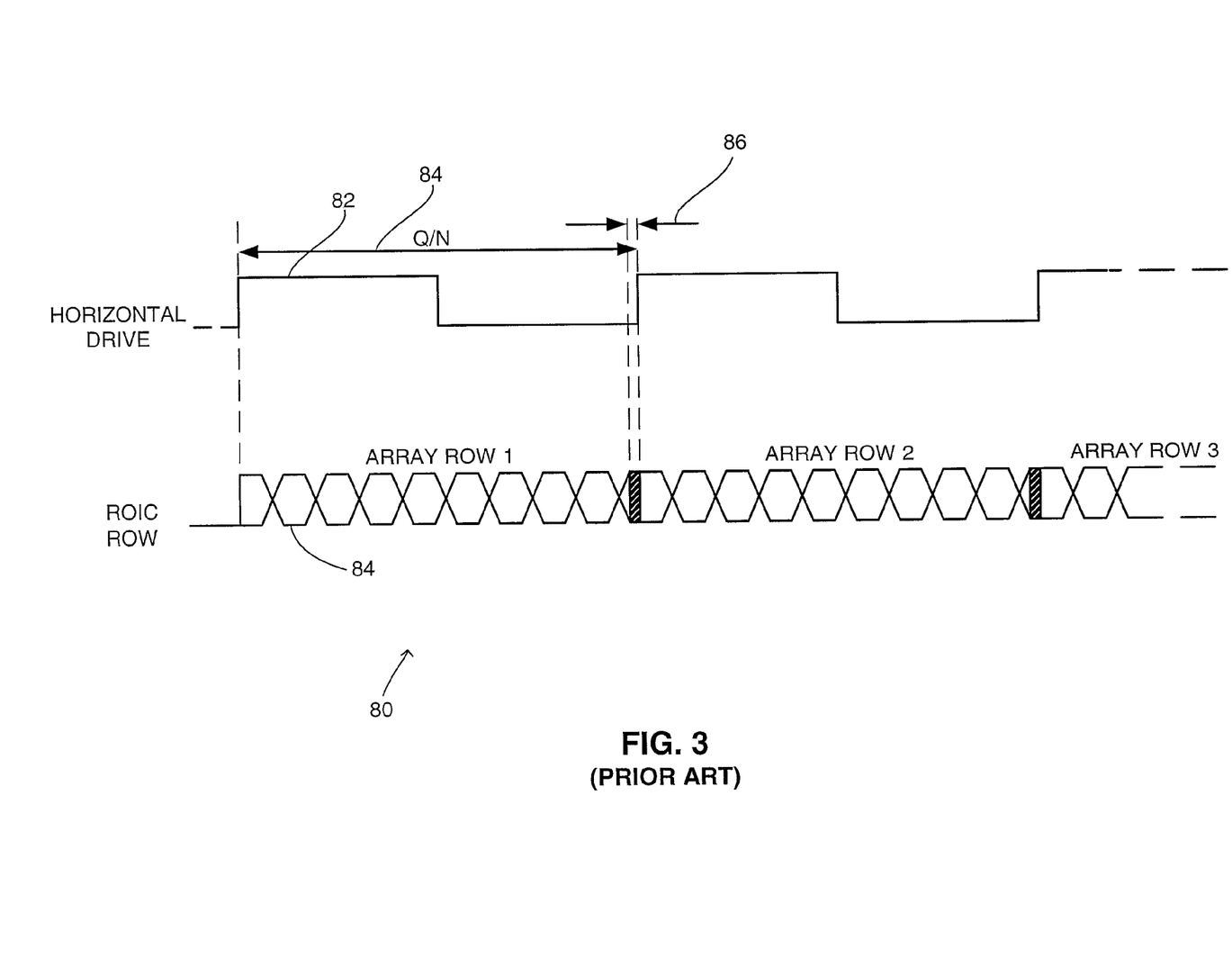
FIG. 3 is an illustration of a timing scheme, of FPA system of FIG. 2, which is known in the art.

Reference is made to FIG. 3, which is an illustration of a timing scheme, generally referenced 80, of FPA system 70 in FIG. 2, which is known in the art. FIG. 3 shows, HORIZONTAL DRIVE 82, ROIC ROW signal 84 and a period 86. HORIZONTAL DRIVE represents a signal of time period Q/N that drives the row select circuit. ROIC ROW signal 84 represents the retrieval period of ROIC row 76 in FIG. 2. Period 86, at the end of the retrieval period is the time duration of releasing and resetting the row of ROIC modules.

SUMMARY OF THE PRESENT DISCLOSED TECHNIQUE

It is an object of the disclosed technique to provide a novel system and method for increasing the signal to noise ration of a thermal imaging system which overcomes the disadvantages of the prior art. In accordance with an aspect of the disclosed technique there is thus provided a thermal image acquisition system including a temperature sensor array, a retrieval module array and a row select circuit. The temperature sensor array includes a plurality of temperature sensor rows. Each of the temperature sensor rows includes a plurality of temperature sensors, for detecting electromagnetic radiation energy incident thereon.

The retrieval module array includes a plurality of retrieval module rows each retrieval module row including a plurality of retrieval modules. The retrieval module array is coupled with the temperature sensor array. The retrieval module array is operative for accumulating electrical charge of each the temperature sensors resulting from the electromagnetic radiation energy incident thereon.

The row select circuit is coupled with the temperature sensor array and with the retrieval module array. The row select circuit is operative for coupling the retrieval modules of each of the retrieval module row of the retrieval module array with a respective temperature sensor of a temperature sensor row of the temperature sensor array, for a time period greater than the frame acquisition period divided by the number of temperature sensor rows.

According to another aspect of the disclosed technique there is thus provided a method for acquiring a thermal image. The thermal image is associated with electrical charge, resulting from electromagnetic radiation energy incident on a temperature sensor array.

The method includes the procedures of selecting a temperature sensor row from the temperature sensor array, allocating a retrieval module row from a retrieval module array, and coupling each temperature sensor from the selected temperature sensor row with a respective retrieval module from the allocated retrieval module row. The method further includes the procedures of retrieving the electrical charge of each of the temperature sensors by the respective retrieval modules coupled therewith, and repeating from the procedure of selecting.

Each temperature sensor from the selected temperature sensor row is coupled with a respective retrieval module from the allocated retrieval module row, for a time period greater than the frame acquisition period divided by the number of temperature sensor rows. The procedure of selecting a temperature sensor row is repeated for another temperature sensor row and for another retrieval module row, before the time period of coupling the selected temperature sensor row with the allocated retrieval module row, elapses.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

The disclosed technique overcomes the disadvantages of the prior art by providing a system and a method for integrating microbolometer FPA systems. The system according to the disclosed technique provides a plurality of ROIC rows. The plurality of ROIC rows may integrate a plurality of microbolometer row, simultaneously. In the disclosed system and method, retrieval operation period of each microbolometer pixel is significantly increased, while the frame acquisition period is maintained. The system significantly increases the output signal of the system. Thus, the signal-to-noise ratio of the system increases, and the performance of the system improves.

Figure 4:
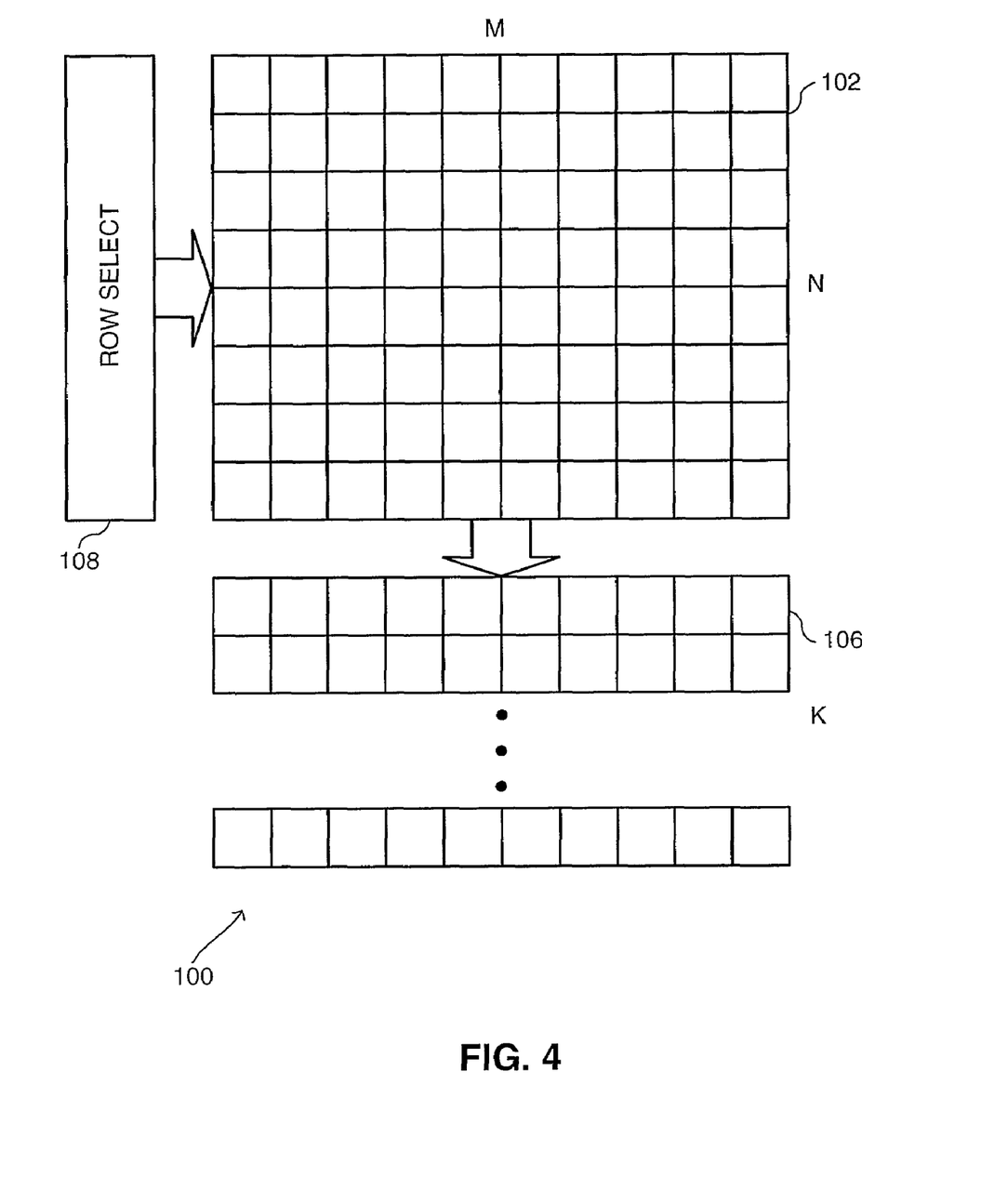
FIG. 4 is a schematic illustration of an FPA system, constructed and operative in accordance with an embodiment of the disclosed technique.

Reference is made to FIG. 4, which is a schematic illustration of an FPA system, generally referenced 100, constructed and operative in accordance with an embodiment of the disclosed technique. Systems 100 includes an N×M array 102 of microbolometer pixels, K×M array 106 of ROIC modules and a row select circuit 108. Array 102 is coupled with row select circuit 108 and array 106. Row select circuit 108 is further coupled with array 106. Row select circuit 108 selects a group of rows from array 102. The selected rows are coupled with respective allocated rows from array 106.

Each ROIC row in array 106 sequentially retrieves the rows from array 102 that the ROIC row is allocated to. Initially system 100 allocates and couples the first ROIC row to the first microbolometer row. After Q/N, system 100 allocates and couples the second ROIC row to the second microbolometer row. When all the K ROIC rows are coupled, the system waits for another Q/N seconds, releases and resets the first ROIC row, and couples the K+1 microbolometer row to the first ROIC row.

According to another embodiment of the disclosed technique, a group of K microbolometer rows may be coupled at the same time, as a group to K ROIC rows, and released, at the same time, as a group.

Figure 5:
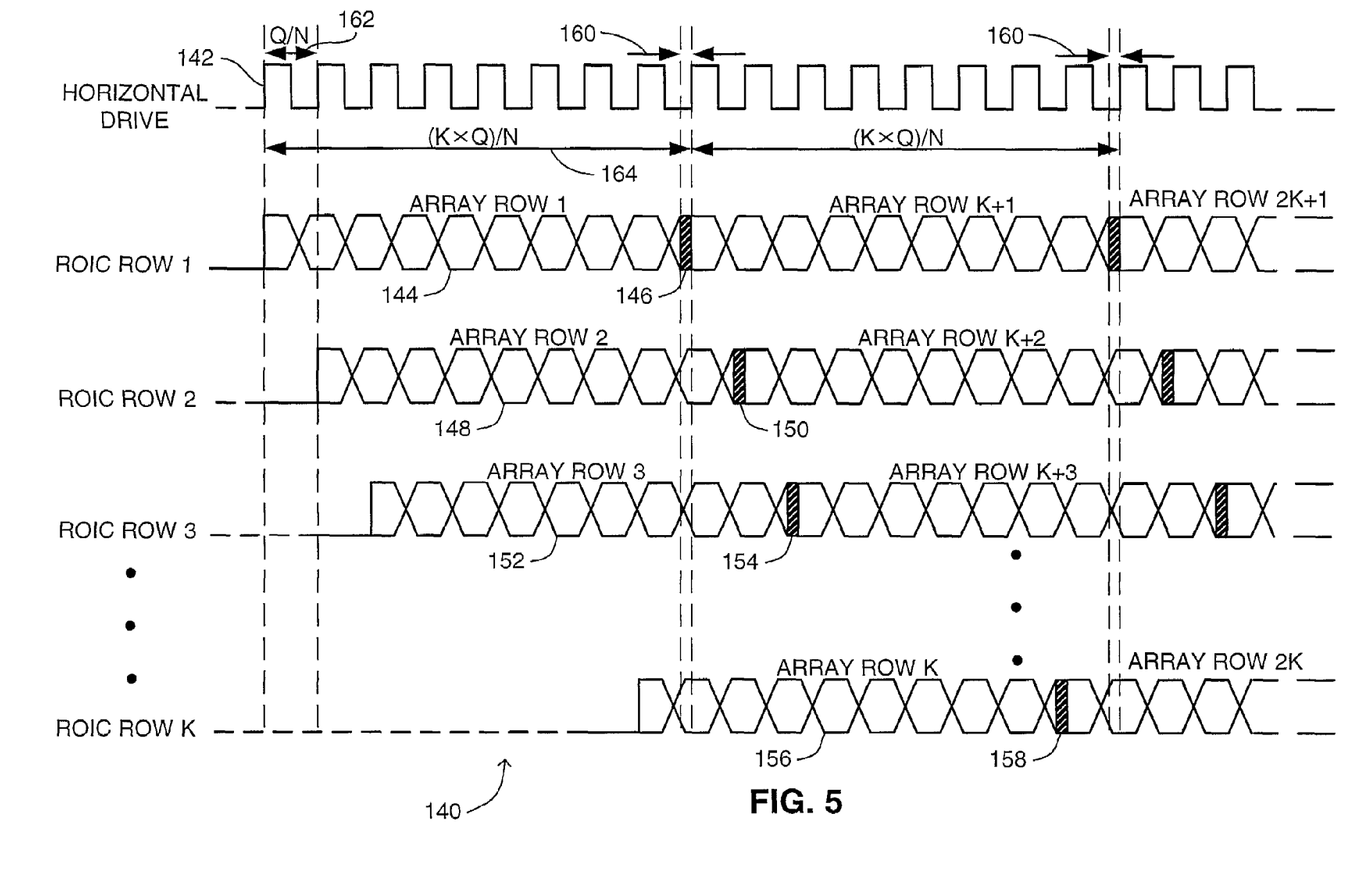
FIG. 5 is a schematic illustration a timing scheme for retrieving a microbolometer array in accordance with another embodiment of the disclosed technique.

Reference is now made to FIG. 5, which is a schematic illustration of a timing scheme, for retrieving a microbolometer array generally referenced 140, in accordance with a further embodiment of the disclosed technique. FIG. 5 shows a HORIZONTAL DRIVE signal 142, ROIC ROW signals 144, 148, 152, 156, periods 146, 150, 154, 158 and period 160. HORIZONTAL DRIVE signal 142 is of period Q/N and represents the signal driving row select circuit 108 in FIG. 4. ROIC ROW signals 144, 148, 152, 156 are of period (K×Q)/N and represent retrieval periods of the ROIC rows of array 106 in FIG. 4. Periods 146, 150, 154, 158 at the end of each ROIC ROW signal is the time duration required for releasing and resetting the modules of the ROIC row of array 106 in FIG. 4. Periods 146, 150, 154, 158 are of the same duration as period 160. In timing scheme 140, each ROIC row sequentially retrieves the microbolometer rows the ROIC row is allocated to. The retrieval operation is represented by signals 144, 148, 152, 156. Each retrieval period is of time period of (K×Q)/N. At the end of each retrieval period, the modules in the ROIC row are released (i.e., transferring the resulting integrated electrical signal out of the ROIC row). After the ROIC row is released, the ROIC modules are reset (i.e., clearing the ROIC module from previous integrated values). Therefore, Integration period is slightly less than (K×Q)/N since releasing and resetting the modules in the ROIC row, takes a few microseconds. The time duration of releasing and resetting the ROIC rows indicated by periods 146, 150, 154, and 158.

In the system according to the disclosed technique, rows of microbolometers are coupled with rows of ROICs at a predetermined switching interval. The system releases the each ROIC no later than a predetermined integration period, after the each ROIC row was coupled.

Figure 6:
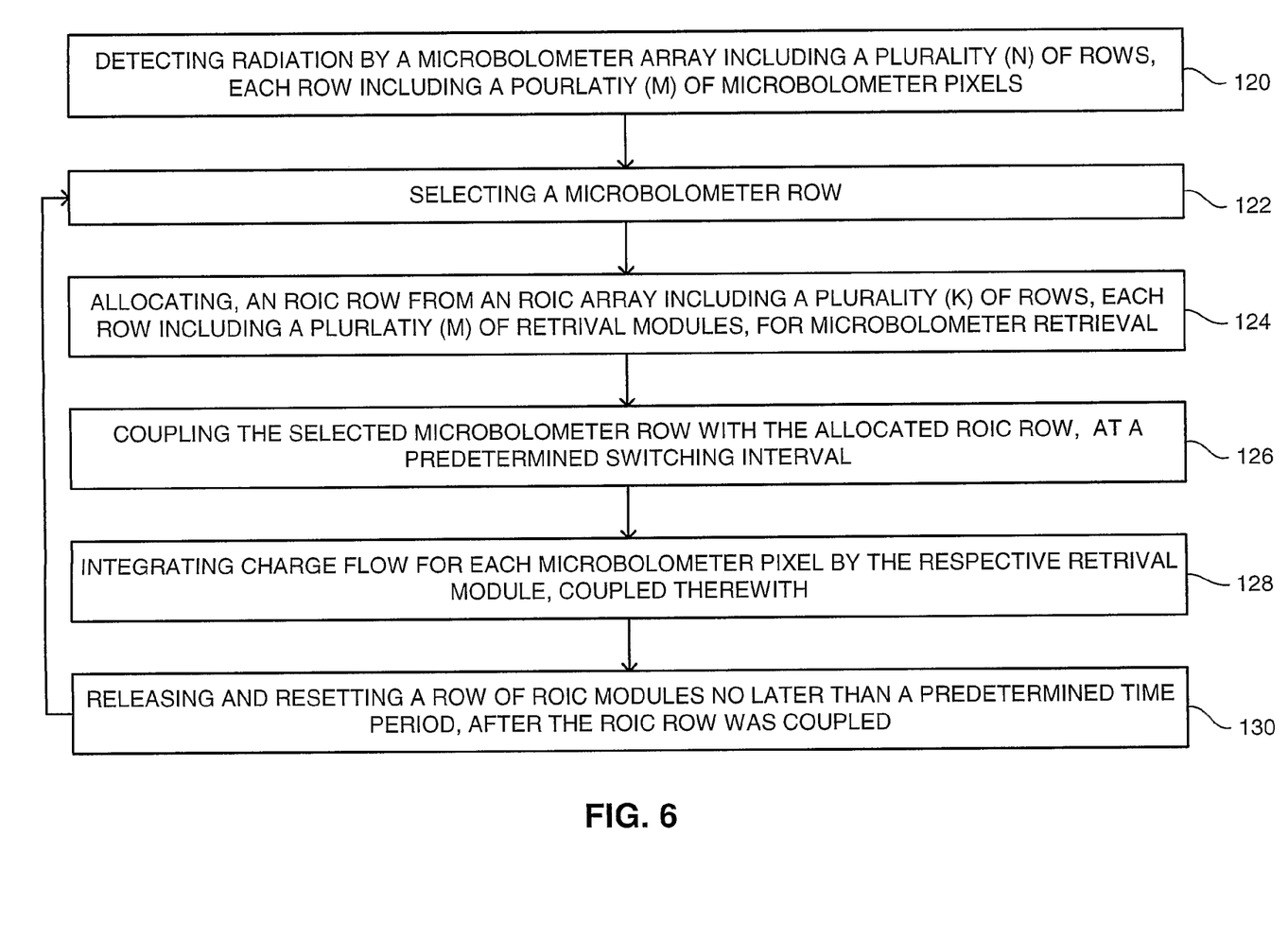
FIG. 6 is a schematic illustration of a method for retrieving the pixels in a microbolometer array constructed in accordance with a further embodiment of the disclosed technique.

Reference is now made to FIG. 6, which is a schematic illustration of a method for retrieving the pixels in a microbolometer array constructed in accordance with a further embodiment of the disclosed technique. In the method according to the disclosed technique, the retrieval operation period of each microbolometer pixel is increased, while the frame acquisition period is maintained. Thus, integration period also increases.

In procedure 120, radiation, incident on an array of microbolometers, is detected. The array of microbolometers consists of a plurality of rows (N), each row consists of a plurality (M) of microbolometer pixels. The incident radiation changes the resistance of the microbolometer during the exposure period of the microbolometer. Thus, the current through the microbolometer changes during the retrieval period. With reference to FIG. 4, the incident radiation is detected by array 102.

In procedure 122, a row of microbolometer pixels is selected. The selected row of microbolometers is the row the system attempts to retrieve. With reference to FIG. 4, row select circuit 108 selects a row, of microbolometer pixels from array 102.

In procedure 124, an ROIC row from an ROIC array is allocated for microbolometer retrieval. The ROIC array includes a plurality of rows, each row includes a plurality of ROICs. The retrieval operation includes integrating the resulting current flowing through the microbolometer by the ROIC and transferring the signal resulting from the integration out of the FPA. With reference to FIG. 4, a row of ROIC modules from array 106 is allocated, to the microbolometer row selected from array 102.

In procedure 126, a selected row of microbolometer pixels is coupled with the respective allocated ROIC row, at a predetermined switching interval. The first microbolometer row is temporarily coupled with the first allocated ROIC row. After a predetermined switching interval, the second row of microbolometer is temporarily coupled with the second ROIC row. The process repeats in a circular manner for all K ROIC rows. An ROIC row may be released from a previously coupled microbolometer row, prior to coupling. With reference to FIG. 5, the predetermined switching interval is Q/N, indicated by period 162.

In procedure 128, the charge flow from each microbolometer pixel, is integrated by the respective ROIC coupled therewith. Integration is aimed at accumulating the charge flow over a predetermined time period. With reference to FIG. 5, period of integration performed by the ROIC rows is slightly less than (K×Q)/N, indicated by period 164.

In procedure 130, a row of ROIC modules is released and reset no later than a predetermined time period after the ROIC row was coupled. The predetermined time period is the integration period of each ROIC row (i.e.,(K×Q)/N). Releasing is aimed to transfer the resulting electrical signal out of the array of pixels. Resetting is the operation of clearing the ROIC from previous values to ensure the integrity of the values resulting from the next integration operation the method returns to procedure 120. With reference to FIG. 5, an ROIC row is released and reset at a period of (K×Q)/N after it was coupled. Releasing and resetting, takes several microseconds. The releasing and resetting periods are indicted by periods 146, 150, 154 and 158.

The temperature of the bolometer increases as electrical current passes through it. The increase in temperature due to electrical current flow is called self-heating. According to the disclosed technique, integration period is increased be a factor of K over the prior art. Consequently current will flow thorough the microbolometers for a longer time. Therefore, it is desirable to reduce the reference current through the bolometer by a factor of $\sqrt{K}$ in order reduce self-heating. If the reference current is reduced by a factor of $\sqrt{K}$ and integration period is increased by a factor of K over the prior art, the Johnson noise remains unchanged according to equation (3). In the system according to the disclosed technique, the electrical signal at the output of the ROIC is proportional to the current through the bolometer multiplied by the integration period. Since the integration period is increased by a factor of K over the prior art, and the reference current through the microbolometer is decreased by a factor of $\sqrt{K}$, the output signal of the ROIC has increased by a factor of $\sqrt{K}$. Since the Johnson noise is unchanged, the signal-to-noise ratio of the system according to the disclosed technique, improves by a factor of $\sqrt{K}$ over the prior art.

Theoretically, K can be increased to be equal to the number of rows, N, of array 102 in FIG. 4 (i.e., K=N). However, choosing K=N has limited advantages since the integration period is increased to slightly less than the frame acquisition period. Increasing the integration period without reducing the reference current, increases the temperature of the microbolometer due to self-heating. The temperature increase may be above the minimum detectable temperature difference of the microbolometer (i.e., the smallest change in temperature the microbolometer responses to). An increase in temperature, due to self-heating, above the minimum detectable temperature difference, may result in erroneous measurements. Therefore, the reference current should be substantially reduced, to reduce the self-heating of the microbolometer below the minimum detectable temperature difference. Substantially reducing the reference current, reduces the value of the current flowing into the ROIC. Therefore, the current flowing into the ROIC becomes extremely small compared with currents produced by the different noise source of the system. Consequently, the signal to noise ratio of the system reduces. In practice, K is chosen to be between 7 and 10.

It will be appreciated by persons skilled in the art that the disclosed technique is not limited to what has been particularly shown and described hereinabove. Rather the scope of the disclosed technique is defined only by the claims, which follow.

The invention claimed is:

1. A device, for retrieving electrical charge, resulting from electromagnetic radiation energy incident on a temperature sensor array, said temperature sensor array including a plurality of temperature sensor rows, each temperature sensor row including a plurality of temperature sensors, the device comprising:
   a retrieval module array including a plurality of retrieval module rows, each retrieval module row including a plurality of retrieval modules, each said retrieval modules being operative to accumulate said electrical charge, from a single temperature sensor; and
   a row select circuit, coupled with said temperature sensor array and with said retrieval module array, for coupling said retrieval modules of each said retrieval module row of said retrieval module array with a respective temperature sensor of a temperature sensor row of said temperature sensor array, for a time period which is greater than the frame acquisition period divided by the number of said temperature sensor rows.

2. The device according to claim 1, wherein each said temperature sensors is a microbolometer.

3. The device according to claim 2, wherein said time period is no greater than the number of said retrieval module rows multiplied by the frame acquisition period and divided by the number of said temperature sensor rows.

4. The device according to claim 1, wherein said time period is no greater than the number of said retrieval module rows multiplied by the frame acquisition period and divided by the number of said temperature sensor rows.

5. A thermal image acquisition system comprising:
   a temperature sensor array including a plurality of temperature sensor rows, each said temperature sensor rows including a plurality of temperature sensors, for detecting electromagnetic radiation energy incident thereon;
   a retrieval module array including a plurality of retrieval module rows each retrieval module row including a plurality of retrieval modules, said retrieval module array being coupled with said temperature sensor array, for accumulating electrical charge of each said temperature sensors resulting from said electromagnetic radiation energy incident thereon; and
   a row select circuit, coupled with said temperature sensor array and with said retrieval module array, for coupling said retrieval modules of each said retrieval module row of said retrieval module array with a respective temperature sensor of a temperature sensor row of said temperature sensor array, for a time period which is greater than the frame acquisition period divided by the number of said temperature sensor rows.

6. The system according to claim 5, wherein each said temperature sensor is a microbolometer.

7. The system according to claim 6, wherein said time period is smaller than the frame acquisition period multiplied by the number of said retrieval module rows and divided by the number of said temperature sensor rows.

8. The system according to claim 5, wherein said time period is smaller than the frame acquisition period multiplied by the number of said retrieval module rows and divided by the number of said temperature sensor rows.

9. A method for acquiring a thermal image, the thermal image being associated with electrical charge, the electrical charge resulting from electromagnetic radiation energy incident on a temperature sensor array, the temperature sensor array including a plurality of temperature sensor rows, each temperature sensor row including a plurality of temperature sensors, the method comprising the procedures of:
   selecting a temperature sensor row from said temperature sensor array;
   from a retrieval module array, said retrieval module array including a plurality of retrieval module rows, allocating a retrieval module row, wherein each said retrieval module row includes a plurality of retrieval modules;
   coupling each said temperature sensor from said selected temperature sensor row with a respective retrieval module from said allocated retrieval module row, for a time period which is greater than the frame acquisition period divided by the number of said temperature sensor rows;
   retrieving said electrical charge of each of said temperature sensors by the respective said retrieval modules coupled therewith; and
   repeating from said procedure of selecting, for another of said temperature sensor row and another retrieval module row, before said time period elapses, with respect to said selected temperature sensor row and said allocated retrieval module row.

10. The method according to claim 9, wherein each of said temperature sensors is a microbolometer.

11. The method according to claim 10, wherein said procedure of retrieving includes accumulating said electrical charge, releasing said retrieval modules and resetting said retrieval modules.

12. The method according to claim 10, wherein said time period is no greater than the frame acquisition period multiplied by the number of said retrieval module rows and dividing by the number of said temperature sensor rows.

13. The method according to claim 9, wherein said procedure of retrieving includes accumulating said electrical charge, releasing said retrieval modules and resetting said retrieval modules.

14. The method according to claim 13, wherein said time period is no greater than the frame acquisition period multiplied by the number of said retrieval module rows and dividing by the number of said temperature sensor rows.

15. The method according to claim 9, wherein said time period is no greater than the frame acquisition period multiplied by the number of said retrieval module rows and dividing by the number of said temperature sensor rows.

* * * * *